(12) United States Patent
Bergman et al.

(10) Patent No.: US 12,482,265 B2
(45) Date of Patent: Nov. 25, 2025

(54) SYSTEMS AND METHODS FOR REPEAT OFFENDER ANTI-THEFT NOTIFICATION BASED ON VEHICLE IDENTIFICATION

(71) Applicant: Sensormatic Electronics, LLC, Boca Raton, FL (US)

(72) Inventors: Adam S. Bergman, Boca Raton, FL (US); Gopi Subramanian, Delray Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 24 days.

(21) Appl. No.: 18/410,430

(22) Filed: Jan. 11, 2024

(65) Prior Publication Data

US 2024/0242504 A1 Jul. 18, 2024

Related U.S. Application Data

(60) Provisional application No. 63/438,974, filed on Jan. 13, 2023.

(51) Int. Cl.
*G06V 20/52* (2022.01)
*G06V 20/40* (2022.01)
*G06V 20/62* (2022.01)
*G06V 20/70* (2022.01)

(52) U.S. Cl.
CPC .............. *G06V 20/52* (2022.01); *G06V 20/44* (2022.01); *G06V 20/625* (2022.01); *G06V 2201/07* (2022.01)

(58) Field of Classification Search
CPC ...... G06V 20/52; G06V 20/44; G06V 20/625; G06V 20/70; G06V 27/80; G06V 20/59; G06V 20/00

USPC ......... 348/118, 120, 61, 129, 130, 142, 135, 348/136

See application file for complete search history.

(56) References Cited

U.S. PATENT DOCUMENTS

| | | | |
|---|---|---|---|
| 2002/0027523 A1* | 3/2002 | Muramatsu | G08G 1/205 342/357.57 |
| 2007/0024708 A1* | 2/2007 | Lin | H04N 7/181 348/E7.086 |
| 2007/0069921 A1 | 3/2007 | Sefton | |
| 2014/0254890 A1 | 9/2014 | Bergman et al. | |
| 2019/0243368 A1* | 8/2019 | Seki | B60W 60/00253 |
| 2019/0304190 A1* | 10/2019 | Johnson | G06F 3/013 |
| 2021/0082265 A1 | 3/2021 | Sequeira et al. | |

(Continued)

FOREIGN PATENT DOCUMENTS

| | | |
|---|---|---|
| CN | 111597962 A | 8/2020 |
| DE | 102013102951 A1 | 9/2014 |

(Continued)

*Primary Examiner* — Daquan Zhao
(74) *Attorney, Agent, or Firm* — ArentFox Schiff LLP

(57) ABSTRACT

Systems and methods are disclosed for detecting a security event at an establishment, obtaining, based on detecting the security event, vehicle information associated with a vehicle used in conjunction with the security event, storing the vehicle information, detecting, based on the vehicle information, the vehicle arriving at the establishment or another establishment, and generating, based on detecting the vehicle arriving at the establishment or another establishment, a notification that the vehicle has arrived at the establishment or another establishment.

20 Claims, 7 Drawing Sheets

(56) References Cited

U.S. PATENT DOCUMENTS

| | | |
|---|---|---|
| 2021/0097832 A1 | 4/2021 | Bergman |
| 2021/0365894 A1 | 11/2021 | Ma et al. |
| 2021/0372807 A1* | 12/2021 | Andou ............... G01C 21/3484 |

FOREIGN PATENT DOCUMENTS

| | | |
|---|---|---|
| GB | 2515070 A | 12/2014 |
| JP | 2005128934 A | 5/2005 |
| JP | 2007199840 A | 8/2007 |
| JP | 2022080554 A | 5/2022 |

* cited by examiner

SYSTEMS AND METHODS FOR REPEAT OFFENDER ANTI-THEFT NOTIFICATION BASED ON VEHICLE IDENTIFICATION

CLAIM OF PRIORITY UNDER 35 U.S.C. § 119

The present Application for Patent claims priority to Provisional Patent Application No. 63/438,974, entitled "SYSTEMS AND METHODS FOR REPEAT OFFENDER ANTI-THEFT NOTIFICATION BASED ON VEHICLE IDENTIFICATION" filed Jan. 13, 2023, which is assigned to the assignee hereof and hereby expressly incorporated by reference herein for all purposes.

BACKGROUND

The present disclosure relates generally to security systems, and more particularly, to systems and methods for repeat offender anti-theft notification.

Typical electronic article surveillance (EAS) systems initiate an EAS alarm when an individual that is shoplifting leaves a retail store with a unpurchased product. In some cases, however, a retailer may instruct a store clerk to not pursue the individual, for example, due to safety issues. In any case, an alarm triggered upon leaving a store may not be sufficient notice for the store clerks and/or the retailers to deal with the problem.

Accordingly, improvements in EAS systems are desired.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, a method of identifying a vehicle by a security system is provided that includes detecting a security event at an establishment, obtaining, based on detecting the security event, vehicle information associated with a vehicle used in conjunction with the security event, storing the vehicle information, detecting, based on the vehicle information, the vehicle arriving at the establishment or another establishment, and generating, based on detecting the vehicle arriving at the establishment or another establishment, a notification that the vehicle has arrived at the establishment or another establishment.

In another aspect, an apparatus is provided that includes one or more memories storing instructions for identifying a vehicle associated with a security event at an establishment, and one or more processors communicatively coupled with the one or more memories. The one or more processors are configured to detect a security event at an establishment, obtain, based on detecting the security event, vehicle information associated with a vehicle used in conjunction with the security event, store the vehicle information, detect, based on the vehicle information, the vehicle arriving at the establishment or another establishment, and generate, based on detecting the vehicle arriving at the establishment or another establishment, a notification that the vehicle has arrived at the establishment or another establishment.

In another aspect, one or more computer-readable media storing instructions, executable by one or more processors, for identifying a vehicle by a security system are provided. The instructions include instructions for detecting a security event at an establishment, obtaining, based on detecting the security event, vehicle information associated with a vehicle used in conjunction with the security event, storing the vehicle information, detecting, based on the vehicle information, the vehicle arriving at the establishment or another establishment, and generating, based on detecting the vehicle arriving at the establishment or another establishment, a notification that the vehicle has arrived at the establishment or another establishment.

In another aspect, a security system is provided that includes various hardware, software, or other components for identifying a vehicle by a security system using one or more methods described herein. In another aspects, a security system is provided that includes means for identifying a vehicle by a security system using one or more methods described herein. In another aspect, a computer-readable medium is provided herein that stores computer executable instructions for identifying a vehicle by a security system using one or more methods described herein.

Further aspects of the present disclosure are described in more details below.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
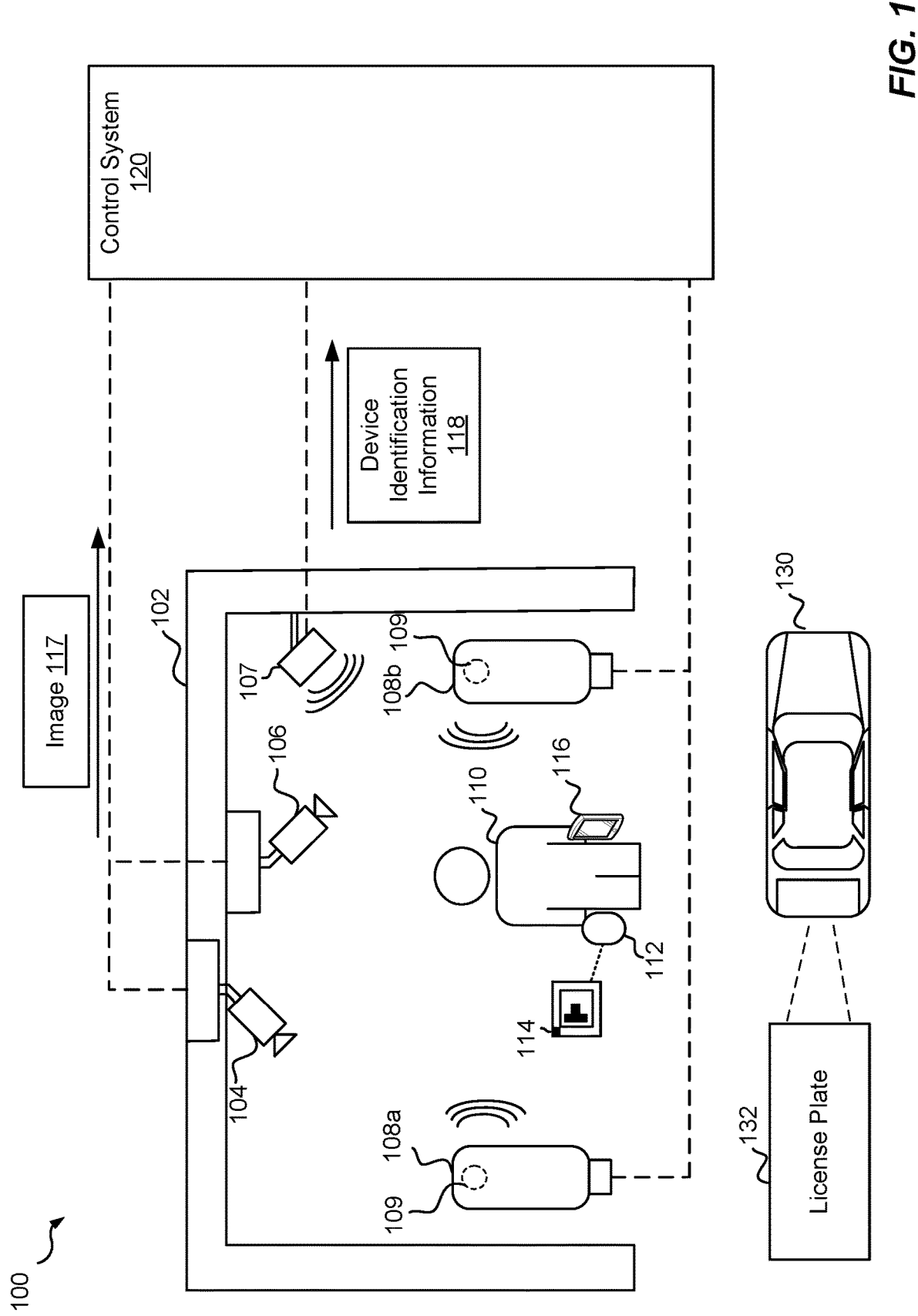
FIG. 1 is a block diagram of an example of a security system, according to implementations of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

In many retail stores, there is a need of identifying repeat offenders in the context of theft incidents or other security events. For theft detection, typical electronic article surveillance (EAS) systems merely provide an alarm to notify store clerks of an individual leaving a store without paying for a product. This means the individual has already performed the theft and may escape without being caught by law enforcement officials.

The present disclosure addresses one or more shortcomings of a typical EAS system by providing systems and methods for repeat offender anti-theft notification at a retail store. In accordance with aspects described herein, the anti-theft notification may occur when the repeat offender is detected and/or before product is stolen. In an example, a system implemented according to the present disclosure may detect vehicle information for a vehicle used in conjunction with a security event. For example, based on detecting a security event, such as product theft, vehicle identification characteristics can be detected, such as a license plate, make, model, etc. of a vehicle leaving the establishment 102 following the security event. The vehicle identification information can be stored for use in identifying return of the vehicle to an area around the establishment 102. When the vehicle is detected as returning to the area around the establishment 102, e.g., by cameras located within or outside of (e.g., around) the establishment 102, cameras located in a parking lot of the establishment 102, etc., a notification can be generated based on detected presence of the vehicle. For example, the notification can be a notification to security personnel, a video surveillance system, a building or area access control system, etc., to alert security personnel, begin recording by the video surveillance system, deny building or area access to the vehicle or a person associated with the vehicle based on detecting the vehicle, etc.

In some examples, the vehicle can be matched to a person (or persons or group of people) that caused the security event, and a profile or index of confidence scores associated with the person (or persons or group of people), the security event, etc. The profile can be used to identify persons of interest (POIs) and/or to detect repeat offenders. In some examples, the system may derive a confidence score for an identification of an individual based on certain technologies, such as facial recognition, wireless (e.g., WiFi or Bluetooth) identifying technologies, etc., which may operate simultaneously to identify persons causing security events. Further, the system may identify an individual as a POI (e.g., potential shoplifting suspect or other type of person that causes a security event) as the individual enters the store (e.g., before the individual has shoplifted or caused another security event). In other words, in some examples, the system may identify the individual as a POI based on a confidence score generated from detecting past actions by the individual. In an example, the system may additionally detect a vehicle of the person or otherwise associated with the security event, such as by identifying a license plate, make, model, etc. of the vehicle via a camera outside of the establishment 102, and may associate a vehicle identity with the POI. The system, for example, may detect subsequent reentry of the vehicle into the parking lot or other area surrounding the establishment 102, and may generate a notification, as described.

The systems and methods described herein may offer a proactive opportunity to stop potential theft "before" it happens, stop potential organized retail crime (ORC), etc., by identifying vehicles associated with known POIs entering the establishment 102 or surrounding area. The incremental benefit of this solution is that the confidence in a notification according to the present disclosure may be higher than those of a typical EAS system due to a linking of a POI with a detected vehicle. In addition, the notification of arrival of the vehicle or associated individual (as opposed to notification after the individual has left) can allow for denying the vehicle and/or associated person(s) access to the establishment (whether by security personnel, automated access control systems, etc.). Moreover, aspects described herein are not limited to retail environments, and may be leveraged in other building scenarios where persons causing security events can be automatically detected, and their vehicles can be observed for subsequent identification and notification, as described herein.

Turning now to the figures, example aspects are depicted with reference to one or more components described herein, where components in dashed lines may be optional. In accordance with aspects described herein actions, functions, and/or described components may be performed by an apparatus, a specially programmed processor, a processor executing specially programmed software or computer-readable media, or by any other combination of a hardware component and/or a software component capable of performing the described actions or functions.

Referring to FIG. 1, an example of a security system 100 deployed at an establishment (e.g., store) 102 is depicted. The security system 100 may include, for example, one or more cameras, which may include one or more outside-facing cameras 104 facing out from an entrance of the establishment 102, which may be located inside the establishment 102 or outside of the establishment 102 (e.g., attached to the establishment 102, attached to another structure in the parking lot, etc.) and/or one or more inside-facing cameras 106 facing inward from the entrance of the establishment 102. The cameras 104, 106 may capture an image 117 (e.g., video image or photographic image) of vehicles entering and/or exiting an area around the establishment 102, individuals (e.g., individual 110) entering and/or exiting the establishment 102, etc. In some examples, the security system 100 may also include, for example, one or more wireless device identification determiners 107 which can attempt to identify a wireless device (e.g., wireless device 116 associated with individual 110) entering and/or exiting the establishment 102 and/or collect a corresponding device identification information 118. Examples of a wireless device identification determiner 107 may include a network sniffer, packet sniffer, packet analyzer, radio frequency identification (RFID) reader, or any other device capable of capturing a device identification from a wireless device.

In some examples, some mechanisms may observe certain parameters indicative of behavior of one or more individuals, and may generate confidence scores of persons of interest (POIs), which include individuals believed to have engaged in theft of items (e.g., item 112) from the establishment 102 or another establishment, or at least associated with one or more previous security events. For example, such mechanisms may consider or analyze an image 117, corresponding device identification information 118, etc., alone or in combination, to generate the confidence scores. In some examples, this information can also be correlated with the vehicle information to associate the vehicle 130 with a POI, which may cause notification related to the vehicle 130 or POI upon detecting entry of the vehicle 130 to an area around the establishment 102 or another establishment.

Exiting the Establishment

In an example, an individual 110 may exit the establishment 102 by passing through one or more pedestal scanners 108a and 108b. When the individual 110 purchases an item 112, an electronic tag 114 (e.g., a radio frequency identifier (RFID) tag, an acousto-magnetic tag, or any other type of EAS device) on the item 112 may be removed or deactivated so that it may not be detected by the scanners 108*a* and 108*b*.

In some instances, the individual 110 may steal or not purchase the item 112, therefore the electronic tag 114 is not deactivated or removed. In this case, when the individual 110 exits from the establishment 102, the pedestal scanners 108*a* and 108*b* may detect that the item 112 with the electronic tag 114 is located near the scanners, and that the item 112 is being carried out of the establishment 102 without having been purchased by the individual 110. As such, the pedestal scanners 108*a* and 108*b* and/or the control system 120 may activate one or more notification devices 109, such as an audio alarm device, a strobe or flashing light device, and/or a notification message sent to security or store personnel to notify the personnel about the security event or potential theft. In some examples, the pedestal scanners 108*a* and 108*b* may generate a data collection event, e.g., instead of or in addition to activating the one or more notification devices 109, and may store data associated with the event, as described further herein.

Concurrently, as the individual 110 is just prior to exiting the establishment 102, or as they are exiting, or after they have exited, the inside-facing camera 106 and/or the outside-facing camera 104 may capture an image 117 (e.g., via recorded video or photographic image) of the individual 110 exiting the establishment 102, a vehicle 130 that the individual 110 uses to depart from (or used to arrive to) the establishment 102, a license plate 132 of the vehicle 130, etc. The camera(s) 104/106 can send the image 117 (or multiple images 117), or data collected from the image(s) 117, such as vehicle make, model, license plate number, etc., to the control system 120 for processing, as described in further detail herein.

In some examples, the wireless device identification determiner 107 may concurrently attempt to detect the wireless device 116. For example, the wireless device identification determiner 107 may attempt to detect a device identification (e.g., media access control (MAC) address, an Internet Protocol address, or any other type of unique device identifier) of the wireless device 116 by scanning WiFi, Bluetooth, RFID, and/or any other wireless protocol. The wireless device identification determiner 107 may send device identification information 118, including device identification of the wireless device 116, to the control system 120 for processing, as described in further detail herein. Based on the images 117, corresponding data, and/or the device identification information 118, the control system 120 may associate the vehicle 130 with the security event and/or multiple security events. This may allow for for subsequently detecting entry of the vehicle 130 into an area around the establishment 102, generating a notification, etc. In another example, based on the images 117, corresponding data, and/or the device identification information 118, the control system 120 may generate a confidence score corresponding to the individual 110 and store the confidence score along with one or more of the vehicle information, person of interest (POI) information (e.g., image of POI or device identification of wireless device corresponding to POI, vehicle identification information for the POT, etc.) for future detections, as described in more detail herein.

In an aspect, the vehicle information, confidence score, POI information, etc. may be shared with other establishments. Further, when a subsequent security event occurs (at the establishment 102 or another establishment) and a second image corresponding to the security event or a second device identification corresponding to the security event matches those of the POI information, the confidence score corresponding to the POI information may be updated based on the subsequent security event. For example, a subsequent confidence score corresponding to subsequent security event may be calculated, and when a feature set (e.g., vehicle information, such as make, model, license plate, etc., or facial features or other characteristics of the individual observed from camera images, etc.) of the second image or the second device identification match the POI information, the second confidence score may be added to the confidence score and stored as the confidence score corresponding to the POI. In one example, a multi-factor (e.g., image plus device identification) confidence score may be used to generate one or more notifications, such as to proactively notify store or security or law enforcement personnel of a potential POI upon the corresponding individual or vehicle being detected as entering an establishment or an area around the establishment, trigger operation of a video surveillance system fixed on the individual, trigger operation of an access control system of the establishment or area around the establishment to restrict access for the vehicle or individual, etc.

Figure 2:
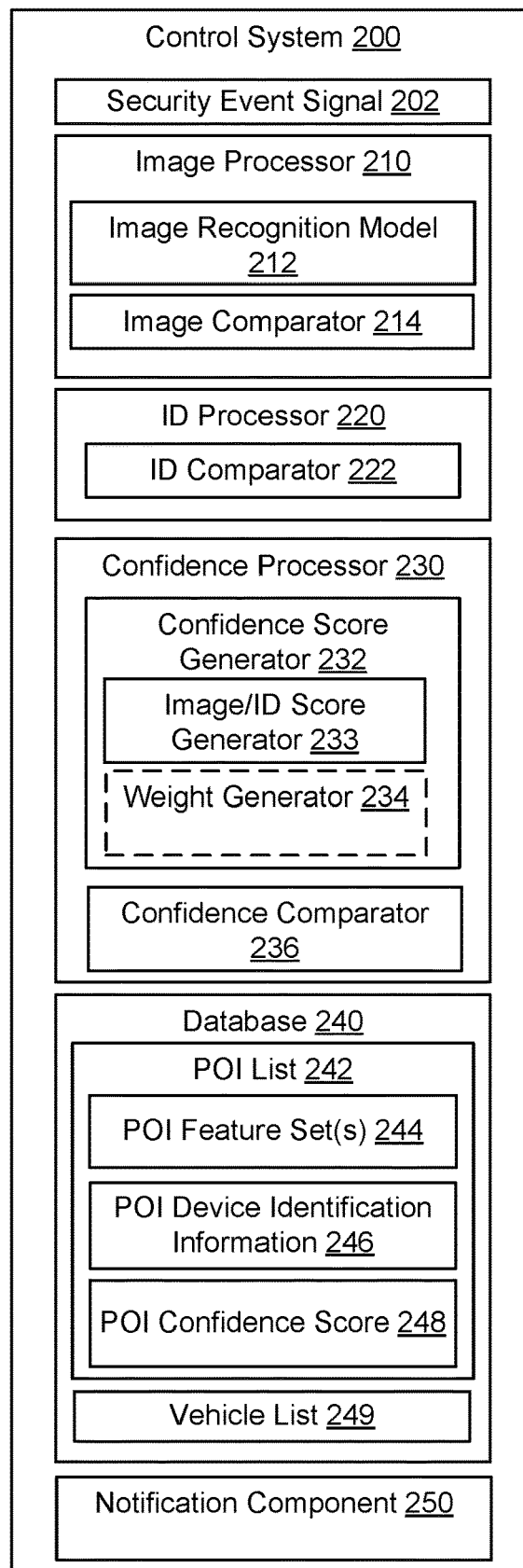
FIG. 2 is a block diagram of an example of a control system implemented by the security system of FIG. 1, according to implementations of the present disclosure.

Referring to FIG. 2, details of the control system 200 (e.g., control system 120) in relation to the individual 110 and\or vehicle 130 exiting the establishment 102 or an area around the establishment are depicted. In an example, the control system 120 may generate a security event signal 202 based on detecting a security event, such as the item 112 being carried out of the establishment 102 without having been purchased by the individual 110. The security event signal 202 may signal to the pedestal scanners 108*a* and 108*b* to send an alert (e.g., via notification devices 109), to the inside-facing camera 106 and/or the outside-facing camera 104 to capture an image 117 of the individual 110 exiting the store, an image of the vehicle 130 or license plate 132 of the vehicle 130 or other vehicle identifying information of the vehicle 130 used by the individual 110 to depart from the store or an area around the store (e.g., the parking lot), etc. In another example, security event signal 202 may signal to the wireless device identification determiner 107 to detect the device identification of the wireless device 116 for associating the security event and/or vehicle 130 with the individual.

The control system 120 may include an image processor 210 configured to process the image 117. In an example, the image processor 210 may obtain the image 117 from the cameras 104 and 106, in response to the security event signal 202. In an example, one or more of the images 117 may be captured from a timeframe that spans before and after the security event signal 202, e.g., within a certain threshold time.

The image processor 210 may also include an image recognition model 212 configured to identify a feature set of the image 117, such as make, model, etc. of the vehicle 130, optical character recognition or other analysis of the license plate 132, other vehicle identification information corresponding to the vehicle 130, facial features or other biometric features corresponding to the individual 110, etc. In an example, the image recognition model 212 may include an image comparator 214 configured to compare the feature set of the image 117 with one or more feature sets 244 of vehicle makes, models, etc., facial features of individuals, etc., stored in a database 240.

The control system 120 may include an ID processor 220 configured to process the device identification information 118. In an example, the ID processor 220 may determine whether the device identification information 118 corresponds to the security event based on the captured time of the device identification information 118. In an example, the ID processor 220 may include an ID comparator 222 configured to compare the device identification information 118 to POI device identification information 246 stored in the database 240.

The control system 120 may include a confidence processor 230 configured to generate and/or update a confidence score corresponding to a POI. In an example, if the image comparator 214 or the ID comparator 222 determines a match, a confidence score corresponding to the POI may be updated. Otherwise, the POI is a new POI and a new confidence score is generated.

The confidence processor 230 may include an image/ID score generator 233 configured to generate an image score (e.g., first score) and an ID score (e.g., second score) corresponding to the security event. In an example, if the image recognition model 212 identifies a feature set of the image 117, the image score may be scored at a predetermined value (e.g., 1), and if the image recognition model 212 does not identify a feature set of the image 117, the image score may be scored at second predetermined value (e.g., 0). Further, if the ID processor 220 obtains a device identification of the wireless device 116 from the device identification information 118, the ID score may be scored at a predetermined value (e.g., 1), and if the ID processor 220 does not obtain the device identification, the ID score may be scored at second predetermined value (e.g., 0).

In some examples, the confidence processor 230 may include a weight generator 234 which weights the image score and/or the ID score. In an example, the weight generator 234 may weight one of the image score or the ID score over the other. For example, the ID score may be weighted at a percentage (e.g., 50%) of the image score such that if both a feature set and a device identification are identified, the image score is, for example, 1 and the ID score is 0.5.

The confidence processor 230 may generate a confidence score based on the image score and the ID score. For example, the confidence score may be the sum of the image score and the ID score. However, other algorithms and calculations may be used, including those considering the weight of the image score and the ID score.

The confidence processor 230 may store the calculated confidence score in the database 240 as the POI confidence score 248. In an example, the POI list 242 may associate the POI confidence score 248 with the one or more of the POI feature sets 244 or the POI device identification information 246. In another example, the database 240 may include a separate vehicle list 249 that can include identification information of vehicles associated with security events (e.g., detected license plate 132 numbers). In an example, the vehicle list 249 may include severity information related to the security event or multiple security events, a security threat level (which may be related to a number of security events associated with the vehicle 130 in the vehicle list 249), etc. As described, the vehicles in the vehicle list 249 may or may not also be associated with a POI for determining when to notify of a detected vehicle.

Entering the Establishment

In an example, the security system 100 may also alert personnel or generate another notification when a POI enters the establishment 102, which may be based on the POI confidence score 248, or when the vehicle 130 associated with the POI or otherwise stored in a vehicle list 249 in the database 240 enters an area around the establishment 102. In one example, the inside-facing camera 106 and/or the outside-facing camera 104 may capture an image 117 (e.g., via recorded video or photographic image) of the vehicle 130 and/or identification information of the vehicle 130, such as the license plate 132. In an example, control system 200 can determine whether the vehicle 130 is present in the vehicle list 249 (e.g., whether the identified license plate 132 number is in the vehicle list) or if the vehicle 130 is otherwise associated with a POI that has a history of causing, or being associated with, detected security events. If so, notification component 250 can generate one or more notifications that the vehicle 130 is entering or has entered an area around the building. As described, for example, the one or more notifications may include a notification to security personnel, a notification to a video surveillance system to automatically track an individual exiting the vehicle 130 and entering the building (and/or their path throughout the building), a notification to an access control system to deny the individual exiting the vehicle access to the establishment 102 or an area around the establishment 102, etc.

In another example, e.g., in associating the vehicle 130 with a POI, the security system 100 may maintain a confidence threshold corresponding to the POI confidence score 248. When the individual 110 and/or the wireless device 116 associated with the vehicle 130 enters the establishment 102, the security system 100 may determine that the individual 110 is a POI based on identifying the vehicle 130, the individual 110, or the wireless device. For example, the inside-facing camera 106 and/or the outside-facing camera 104 may capture an image 117 (e.g., via recorded video or photographic image) of the individual 110 entering the establishment 102 and send the image 117 to the control system 120 for comparison to POI information, as described in further detail herein. Further, the wireless device identification determiner 107 may concurrently attempt to detect the wireless device 116 entering the establishment 102 by scanning WiFi, Bluetooth, RFID, and/or any other wireless protocol to determine a device identification (e.g., MAC address) of the wireless device 116. The wireless device identification determiner 107 may send the device identification information 118, including device identification of the wireless device 116, to the control system 120 for comparison to the POI information, as described in further detail herein. Based on the images 117 and/or the device identification information 118, the control system 120 may determine the individual is a POI when, for example, a features set of the image 117 or the device identification information 118 matches the POI information. In response to determining that the individual is a POI, the security system 100 may compare the confidence score corresponding to the POI with the confidence threshold. When the confidence score exceeds the confidence threshold, this can be indicative of the POI (e.g., individual 110) being involved in a sufficient number of security events that security personnel should be notified of the POI's presence in the establishment 102. When the confidence score does not exceed the confidence threshold, this may indicate that the POI has not been involved in enough security events to warrant a notification to security personnel of the establishment 102.

Referring to FIG. 2, the control system 120 in relation to the individual 110 entering the establishment 102 are depicted. In an aspect, the image processor 210 may receive the image 117 corresponding to the individual 110 entering the establishment 102, and the image comparator 214 may compare a feature set of the image 117 to the POI feature sets 244 to determine whether the individual 110 is a POI. Further, the ID processor 220 may receive the device identification information 118, and the ID comparator 222 may compare any device identification to the POI device identification information 246 to determine whether the individual 110 is a POI. For example, if one or more of the image comparator 214 or the ID comparator 222 determines a match, the individual 110 is determined to be a POI. In another example, image processor 210 can receive the image 117 corresponding to the vehicle 130 entering the area around the establishment 102, and control system 200 can determine if an identification of the vehicle 130 is in the vehicle list 249 or otherwise associated with a POI.

The confidence processor 230 further includes a confidence comparator 236 configured to determine whether to alert a security personnel based on the POI confidence score 248. For example, once the individual 110 is determined to be a POI, the confidence comparator 236 compares the POI confidence score 248 (e.g., 10) with a confidence threshold value (e.g., 9). When the POI confidence score 248 is greater than the confidence threshold value, this may indicate that the POI was involved in multiple security events at the establishment 102 and/or other establishments. Otherwise, when the POI confidence score 248 is not greater than the confidence threshold value, this may indicate that the POI was not involved in a sufficient number of security events to warrant the involvement of security personnel.

The control system 120 may include a notification component 250 configured to alert a security personnel regarding the POI confidence score 248 of the individual 110 exceeding the confidence threshold value. In an example, the notification component 250 may include a wired or wireless transceiver configured to transmit one or more notifications (e.g., email, text, alarm) to a device used by the security personnel.

Accordingly, the security system 100 may provide mechanisms to build a profile of a POI based on information obtained as the individual 110 exits the establishment 102 (or another establishment) and a proactive approach to identify the individual 110 when entering the establishment 102 (or another establishment) and to alert security personnel based on the POI information. In other examples, the security system 100 can provide mechanisms to build a profile of a vehicle 130 based on similar information associated with a vehicle 130 exiting the establishment 102 or area around the establishment 102 following a security event.

Figure 3:
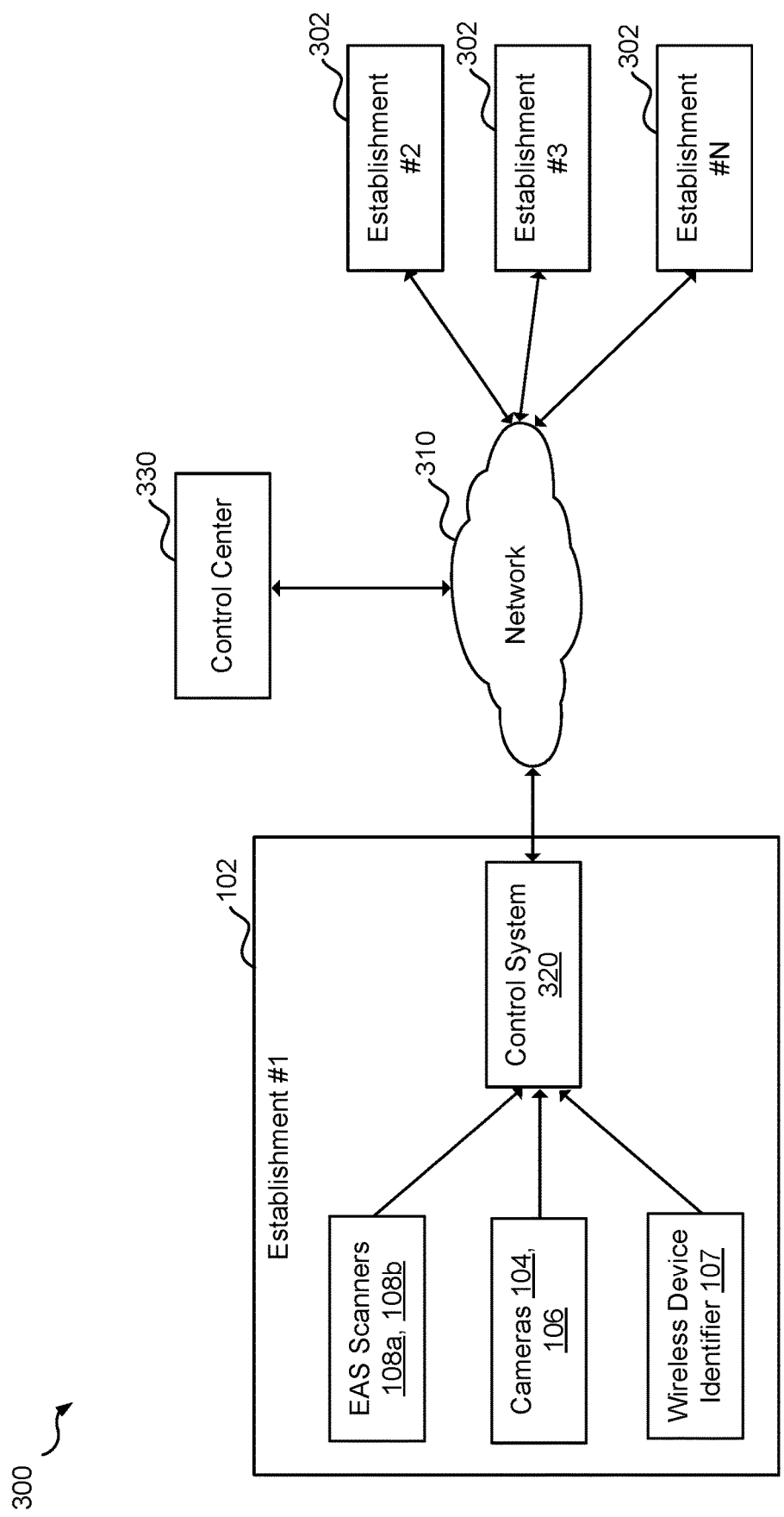
FIG. 3 is a block diagram of an example of a security system of FIG. 1 implemented with other security systems, according to implementations of the present disclosure.

Referring to FIG. 3, an example of a security system 300 configured for multiple establishments is depicted. In an example, the establishment 102 may be one of many establishments in the security system 300. For example, the establishment 102 may communicate with one or more additional establishments 302 via a network 310 to share vehicle information or POI information including images 117 and/or device identification information 118 for security purposes, as described herein. In some examples, the establishment 102 may include the control system 320, which performs all functions of the control system 120. In another example, the security system 300 may also include a control center 330 which, in conjunction with the control system 320, performs all functions of the control system 120.

Figure 4:
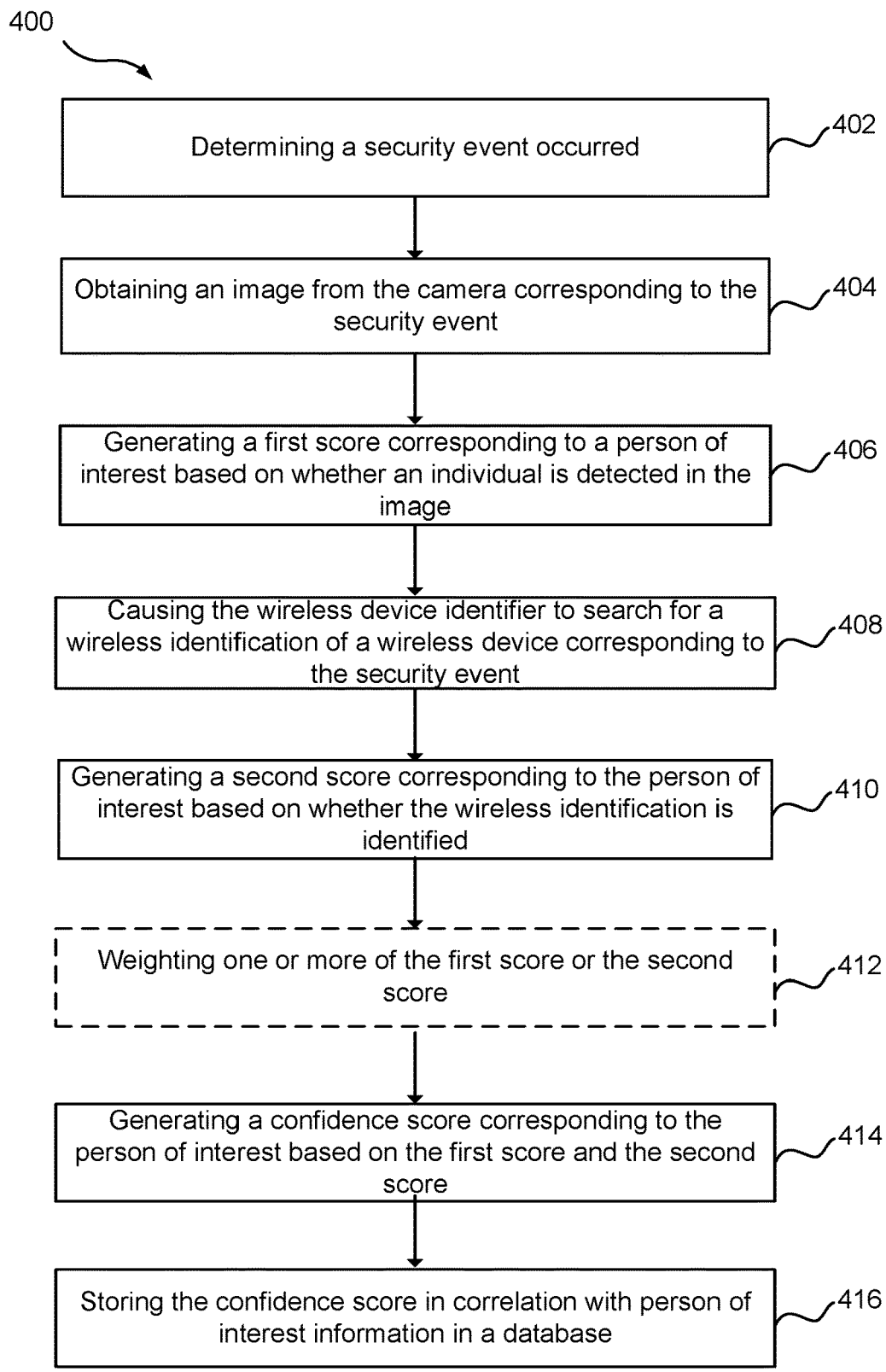
FIG. 4 is a flowchart of an example of a method implemented by the security system of FIG. 1, according to implementations of the present disclosure.

Referring to FIG. 4, an example of a method 400 of identifying a POI at an exit event by the security system 100 or 300 is depicted. The operations of the method 400 may be performed by one or more components of the security system 100 or 300, as described herein.

At 402, the method 400 may include determining a security event has occurred. For example, the control system 120, 200, or 320 (and/or the control center 330) may determine a security event has occurred based on receiving the security event signal 202 from the pedestal scanners 108a and 108b when the item 112 having the electronic tag 114 is located near the scanners.

At 404, the method 400 may also include obtaining, from a camera, an image corresponding to the security event. For example, one or more of the control system 120, 200, or 320 (and/or the control center 330), the image processor 210, or the image recognition model 212 may receive the image 117 (e.g., video image or photographic image) from the one or more of the cameras 104 or 106 corresponding to the security event signal 202 being received. In an example, one or more of the control system 120, 200, or 320 (and/or the control center 330), the image processor 210, or the image recognition model 212 may transmit instructions to the camera 104/106 to capture the image 117 in response to the security event. The one or more of the control system 120, 200, or 320 (and/or the control center 330), the image processor 210, or the image recognition model 212 may receive the image 117 in response to the transmitted instructions.

At 406, the method 400 may include generating a first score corresponding to a POI based on whether an individual is detected in the image. For example, one or more of the control system 120, 200, or 320 (and/or the control center 330), the confidence processor 230, the confidence score generator 232, or the image/ID score generator 233 may generate an image score (e.g., first score) corresponding to one or more of an individual 110 or a feature set of the individual 110 being detected in the image 117. In an example, when the individual 110 and/or a feature set of the individual 110 is identified in the image (e.g., based on output from the image recognition model 212 or image comparator 214), the image score may have a value of 1, and when the not identified, the image score may have a value of 0.

At 408, the method 400 may include causing a wireless device identification determiner to search for a device identification of a wireless device corresponding to the security event. For example, one or more of the control system 120, 200, or 320 (and/or the control center 330) or the ID processor 220 may cause the wireless device identification determiner 107 to search for a device identification information 118 of the wireless device 116 corresponding to the security event. In an example, one or more of the control system 120, 200, or 320 (and/or the control center 330), the image processor 210, or the image recognition model 212 may transmit instructions to the wireless device identification determiner 107 to search for the device identification information 118 in response to the security event. The one or more of the control system 120, 200, or 320 (and/or the control center 330), the image processor 210, or the image recognition model 212 may receive the device identification information 118 in response to the transmitted instructions.

At 410, the method 400 may include generating a second score corresponding to the person of interest based on whether the device identification is identified. For example, one or more of the control system 120, 200, or 320 (and/or the control center 330), the confidence processor 230, the confidence score generator 232, or the image/ID score generator 233 may generate an ID score (e.g., second score) corresponding to the POI based on whether the device identification is identified. In an example, when the device identification is identified, the ID score may have a value of 1, and when the device identification is not identified, the ID score may have a value of 0.

At 412, the method 400 may optionally include weighting one or more of the first score or the second score. For example, one or more of the control system 120, 200, or 320

(and/or the control center 330), the confidence processor 230, the confidence score generator 232, the image/ID score generator 233, or the weight generator 234 may weight one or more of the image score or the ID score. In an example, the image score may be weighted higher than the ID score. For example, the ID score may be weighted at a percentage (e.g., 50%) of the image score.

At 414, the method 400 may include generating a confidence score corresponding to the POI based on the first score and the second score. For example, one or more of the control system 120, 200, or 320 (and/or the control center 330), the confidence processor 230, or the confidence score generator 232 may generate a confidence score corresponding to the POI based on the image score and the ID score. In an example, the confidence score may be generated by summing the image score and the ID score (with or without the weighting, depending on the example).

At 416, the method 400 may include storing the confidence score in correlation with POI information in a database. For example, one or more of the control system 120, 200, or 320 (and/or the control center 330), the confidence processor 230, or the confidence score generator 232 may store the confidence score as POI confidence score 248 and associate the confidence score with POI information such as POI feature sets 244 and/or POI device identification information 246 in the database 240.

Figure 5:
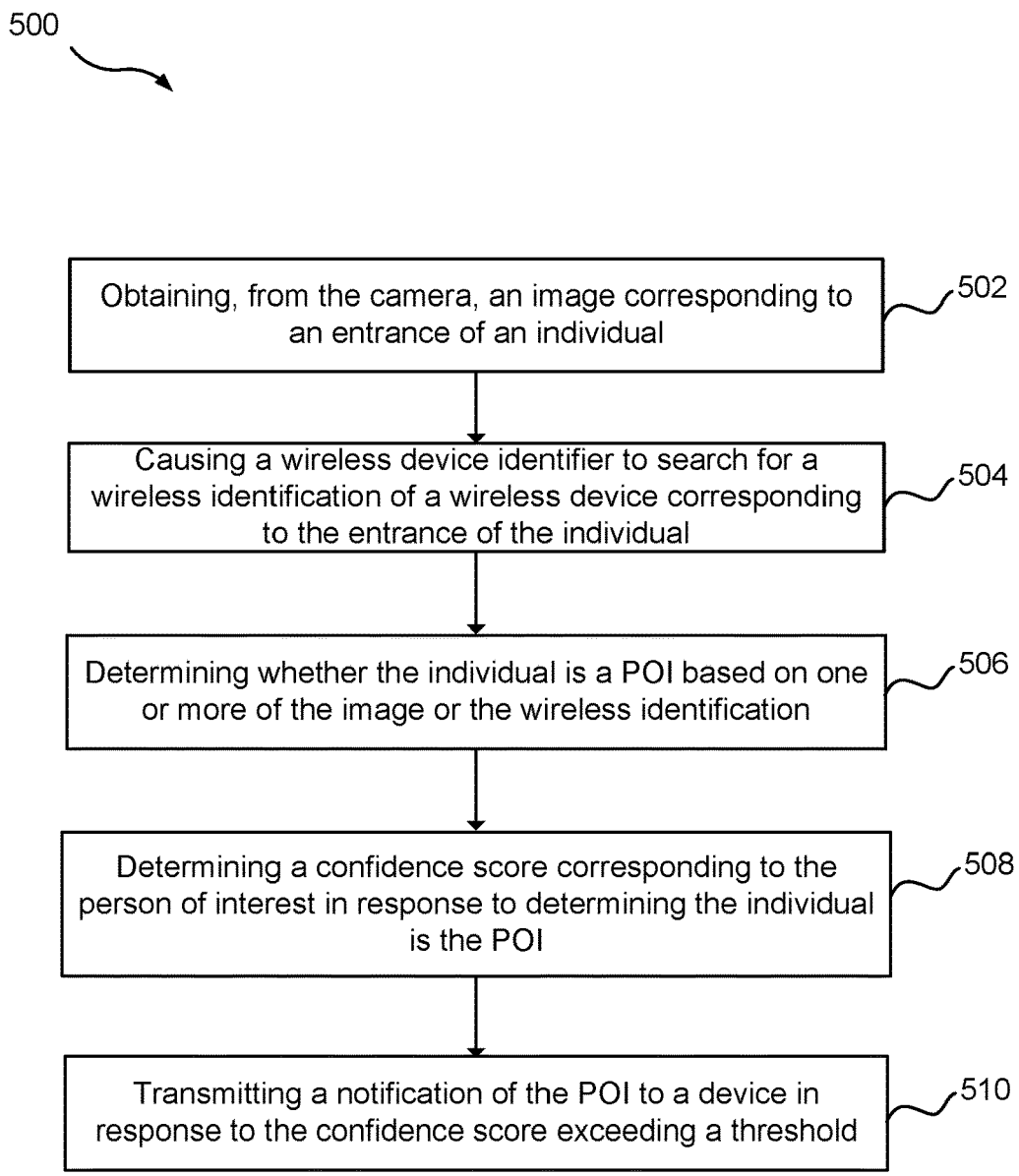
FIG. 5 is a flowchart of another example of a method implemented by the security system of FIG. 1, according to implementations of the present disclosure.

Referring to FIG. 5, an example of a method 500 of identifying a POI at an entrance event by the security system 100 or 300 is depicted. The operations of the method 500 may be performed by one or more components of the security system 100 or 300, as described herein.

At 502, the method 500 may include obtaining, from the camera, an image corresponding to an entrance of an individual. For example, one or more of the control system 120, 200, or 320 (and/or the control center 330), the image processor 210, or the image recognition model 212 may receive the image 117 (e.g., video image or photographic image) from the one or more of the cameras 104 or 106 corresponding to an entrance of the individual 110 at the establishment 102. In an example, one or more of the control system 120, 200, or 320 (and/or the control center 330), the image processor 210, or the image recognition model 212 may transmit instructions to the camera 104/106 to capture the image 117 in response to the entrance. The one or more of the control system 120, 200, or 320 (and/or the control center 330), the image processor 210, or the image recognition model 212 may receive the image 117 in response to the transmitted instructions.

At 504, the method 500 may include causing a wireless device identification determiner to search for a device identification of a wireless device corresponding to the entrance of the individual. For example, one or more of the control system 120, 200, or 320 (and/or the control center 330) or the ID processor 220 may cause the wireless device identification determiner 107 to search for a device identification of the wireless device 116 corresponding to the entrance of the individual 110 into the establishment 102. In an example, one or more of the control system 120, 200, or 320 (and/or the control center 330), the image processor 210, or the image recognition model 212 may transmit instructions to the wireless device identification determiner 107 to search for the device identification information 118 in response to the entrance. The one or more of the control system 120, 200, or 320 (and/or the control center 330), the image processor 210, or the image recognition model 212 may receive the device identification information 118 in response to the transmitted instructions.

At 506, the method 500 may include determining whether the individual is a POI based on one or more of the image or the device identification. For example, one or more of the control system 120, 200, or 320 (and/or the control center 330), the image processor 210, the image recognition model 212, the image comparator 214, the ID processor 220, or the ID comparator 222 may determine whether the individual 110 is a POI. In an example, the individual 110 may be a POI based on a match between a feature set of the image 117 to one or more POI feature sets 244, and/or the individual 110 may be a POI based on a match between a device identification of the wireless device 116 and a POI device identification information 246.

At 508, the method 500 may include determining a confidence score corresponding to the person of interest in response to determining the individual is the person of interest. For example, one or more of the control system 120, 200, or 320 (and/or the control center 330), the confidence processor 230, or the confidence comparator 236 may determine a confidence score corresponding to the POI in response to determining the individual 110 is the POI. In an example, one or more of the control system 120, 200, or 320 (and/or the control center 330), the confidence processor 230, or the confidence comparator 236 may read the POI confidence score 248 associated with the POI information, including the POI feature set 244 and/or the POI device identification information 246, stored in the database 240 and/or the POI list 242.

At 510, the method 500 may include transmitting a notification of the POI to a device in response to the confidence score exceeding a confidence threshold. For example, one or more of the control system 120, 200, or 320 (and/or the control center 330) or the notification component 250 may transmit a notification such as an email, text, or alert to a device associated with security personnel when the confidence score exceeds a confidence threshold value. In an example, one or more of the control system 120, 200, or 320 (and/or the control center 330) or the confidence comparator 236 may compare the POI confidence score 248 associated with the POI to a confidence threshold value to determine whether to transmit the notification.

Figure 6:
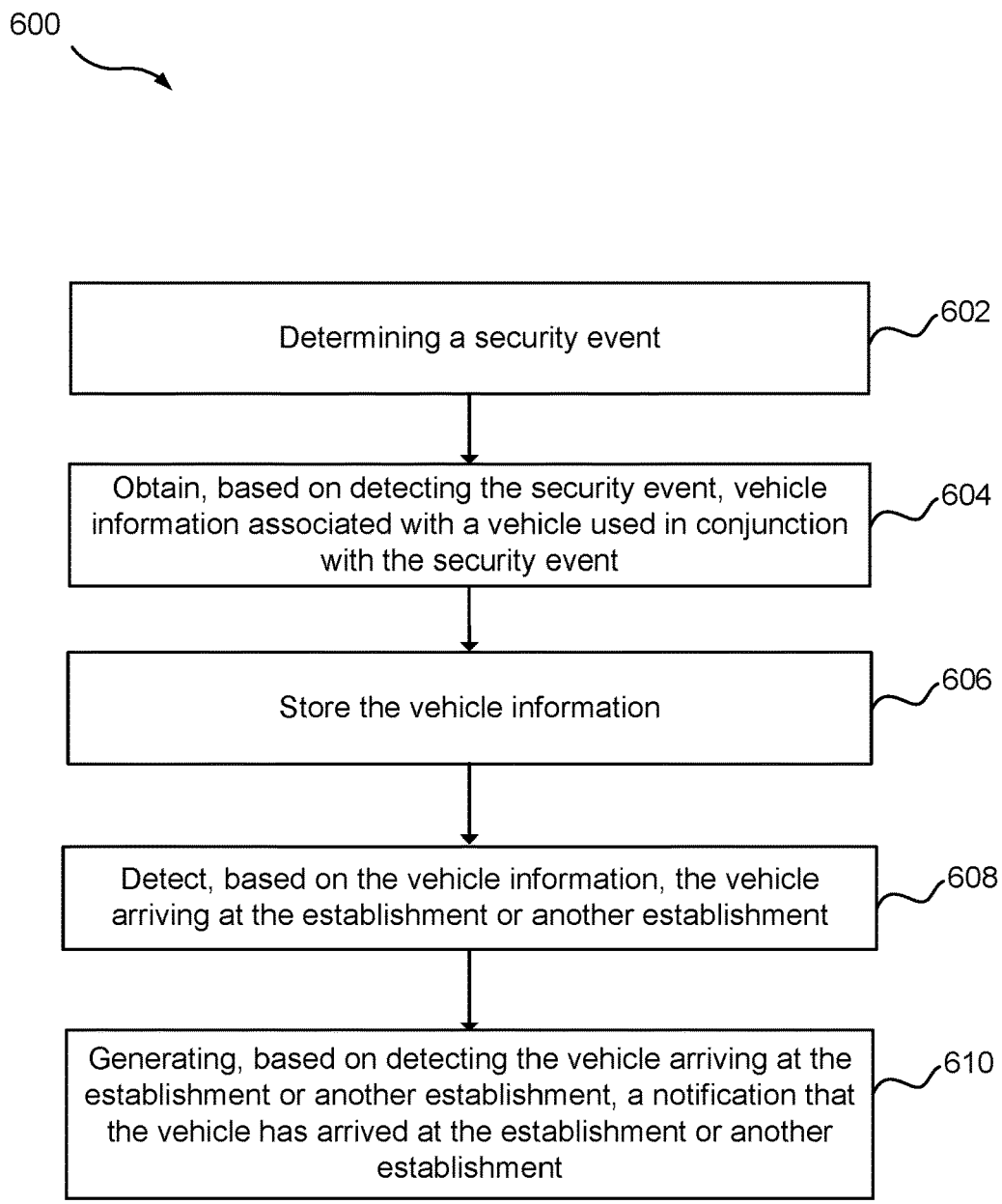
FIG. 6 is a flowchart of another example of a method implemented by the security system of FIG. 1, according to implementations of the present disclosure.

Referring to FIG. 6, an example of a method 600 of identifying a vehicle associated with a security event by the security system 100 or 300 is depicted. The operations of the method 600 may be performed by one or more components of the security system 100 or 300, as described herein.

At 602, the method 600 may include determining a security event has occurred. For example, the control system 120, 200, or 320 (and/or the control center 330) may determine a security event has occurred based on receiving the security event signal 202 from the pedestal scanners 108a and 108b when the item 112 having the electronic tag 114 is located near the scanners.

At 604, the method 600 may also include obtaining, based on detecting the security event, vehicle information associated with a vehicle used in conjunction with the security threat. For example, one or more of the control system 120, 200, or 320 (and/or the control center 330), the image processor 210, or the image recognition model 212 may receive the image 117 (e.g., video image or photographic image) from the one or more of the cameras 104 or 106 corresponding to the security event signal 202 being received. In an example, one or more of the control system 120, 200, or 320 (and/or the control center 330), the image processor 210, or the image recognition model 212 may transmit instructions to the camera 104/106 to capture the image 117 in response to the security event. The one or more of the control system 120, 200, or 320 (and/or the control center 330), the image processor 210, or the image recognition model 212 may receive the image 117 in response to the transmitted instructions. In addition, for example, control system 120, 200, or 320 can process the image 117 to detect a vehicle 130, determine vehicle identification information, such as a license plate 132 number, make, model, etc., from the image, and/or the like.

At 606, the method 600 may include storing the vehicle information. For example, one or more of the control system 120, 200, or 320 (and/or the control center 330, image processor 210, database 240, etc.), can store the vehicle information. For example, the vehicle information can be stored in the database 240 (e.g., in a vehicle list 249), with POI information of a POI detected as using the vehicle to exit the establishment 102 or area around the establishment 102, etc., as described.

At 608, the method 600 may include detecting, based on the vehicle information the vehicle arriving at the establishment or another establishment. For example, one or more of the control system 120, 200, or 320 (and/or the control center 330, image processor 210, notification component 250, etc.) can detect, based on the vehicle information, the vehicle arriving at the establishment or another establishment (e.g., at some time after the security event), which may indicate a security threat caused by an individual associated with the vehicle returning to the establishment or another establishment, or a surrounding area (e.g., a parking lot of the establishment or of another establishment). For example, as described, control system 120, 200, or 320 (and/or the control center 330) can detect the vehicle arriving based on one or more cameras 102/106 capturing an image 117 of arriving vehicles and/or identification information thereof, such as a license plate number. For example, control system 120, 200, or 320 can determine whether detected vehicle identifier information is in the list of vehicle information associated with POIs.

At 610, the method 600 may include generating, based on the vehicle arriving at the establishment or another establishment, a notification that the vehicle has arrived at the establishment or another establishment. For example, one or more of the control system 120, 200, or 320 (and/or the control center 330, notification component 250, etc.) can generate, based on detecting the vehicle arriving at the establishment or another establishment, the notification that the vehicle as arrived at the establishment or another establishment. For example, notification component 250 can generate a notification to security personnel or other security alert system that the vehicle has entered the establishment or an area around the establishment, so security personnel can take desired precaution. In another example, notification component 250 can generate a notification to a video surveillance system to track an individual exiting the vehicle 130 to enter the establishment, where this individual may be captured by one or more of the cameras 104/106 as exiting the vehicle 130 and entering the establishment, etc. In yet another example, notification component 250 can generate a notification to an access control system associated with the establishment to lock an ingress into the establishment or to an area around an establishment to not allow the individual or vehicle 130 to enter, etc. This can allow security personnel or law enforcement to mitigate the risk of the presence of the vehicle 130 or individual(s) associated with the vehicle 130. This can also help to prevent future ORC theft events.

For example, in accordance with aspects described herein, multiple items with security labels can be removed from the store without proper item level "Deactivation." Cameras in parking lot can identify vehicle license plate for vehicle associated with ORC theft event. If same vehicle is associated with theft events repeatedly, cameras at entrance can identify license plate returning to store parking lot. System can notify that potential ORC theft event is about to potentially occur. This can provide an early warning that a potential ORC theft event is about to occur from a notification at the parking lot entrance.

Figure 7:
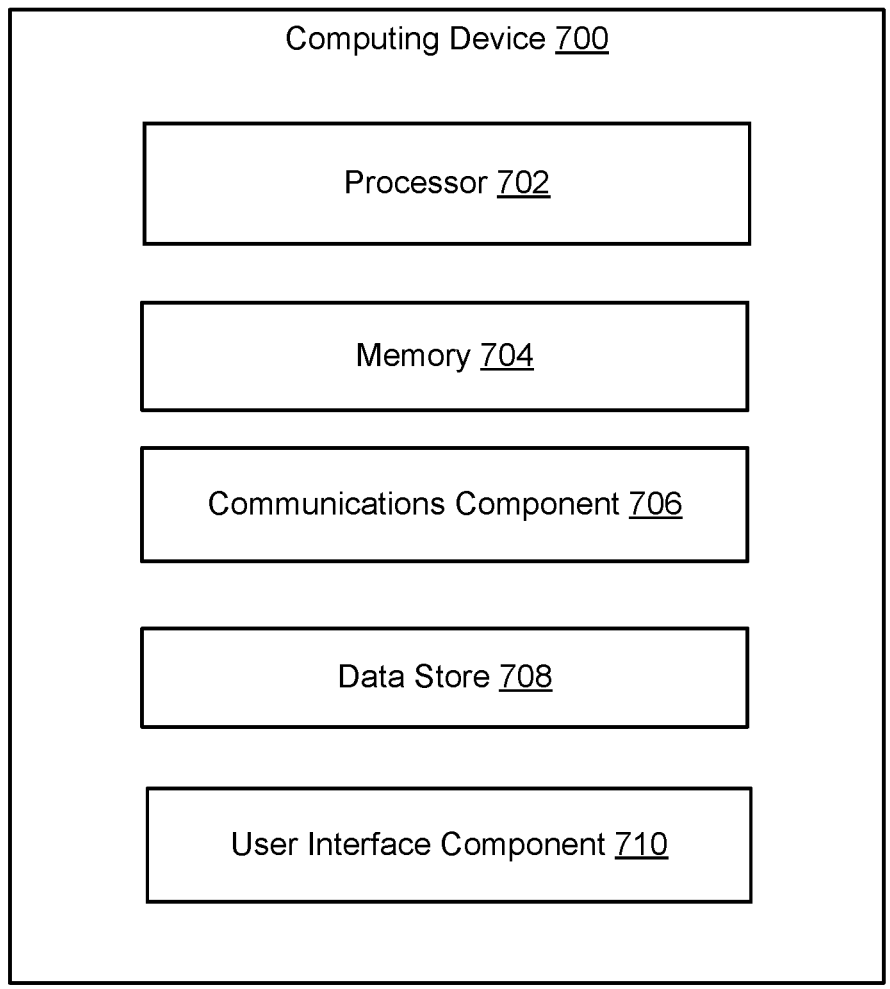
FIG. 7 is a block diagram of examples of components of a computer device that may implement one or more of the features of the security system of FIG. 1.

Referring to FIG. 7, a computing device 700 may implement all or a portion of the functionality described in FIGS. 1-6. For example, the computing device 700 may be or may include at least a portion of the control system 120, 200, or 320, the control center 330, or any other component described herein with reference to FIGS. 1-5. The computing device 700 may include a processor 702 which may be configured to execute or implement software, hardware, and/or firmware modules that perform some or all of the functionality described herein with reference to FIGS. 1-5. For example, the processor 702 may be configured to execute or implement software, hardware, and/or firmware modules that perform some or all of the functionality described herein with reference to the the control system 120, 200, or 320, the control center 330, or any other component described herein with reference to FIGS. 1-5.

The processor 702 may be a micro-controller, an application-specific integrated circuit (ASIC), or a field-programmable gate array (FPGA), and/or may include a single or multiple set of processors or multi-core processors. Moreover, the processor 702 may be implemented as an integrated processing system and/or a distributed processing system. The computing device 700 may further include a memory 704, such as for storing local versions of applications being executed by the processor 702, related instructions, parameters, etc. The memory 704 may include a type of memory usable by a computer, such as random access memory (RAM), read only memory (ROM), tapes, magnetic discs, optical discs, volatile memory, non-volatile memory, and any combination thereof. Additionally, the processor 702 and the memory 704 may include and execute an operating system executing on the processor 702, one or more applications, display drivers, etc., and/or other components of the computing device 700.

Further, the computing device 700 may include a communications component 706 that provides for establishing and maintaining communications with one or more other devices, parties, entities, etc. utilizing hardware, software, and services. The communications component 706 may carry communications between components on the computing device 700, as well as between the computing device 700 and external devices, such as devices located across a communications network and/or devices serially or locally connected to the computing device 700. In an aspect, for example, the communications component 706 may include one or more buses, and may further include transmit chain components and receive chain components associated with a wireless or wired transmitter and receiver, respectively, operable for interfacing with external devices.

Additionally, the computing device 700 may include a data store 708, which can be any suitable combination of hardware and/or software, that provides for mass storage of information, databases, and programs. For example, the data store 708 may be or may include a data repository for applications and/or related parameters not currently being executed by processor 702. In addition, the data store 708 may be a data repository for an operating system, application, display driver, etc., executing on the processor 702, and/or one or more other components of the computing device 700.

The computing device 700 may also include a user interface component 710 operable to receive inputs from a user of the computing device 700 and further operable to generate outputs for presentation to the user (e.g., via a display interface to a display device). The user interface component 710 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 710 may include one or more output devices, including but not limited to a display interface, a speaker, a haptic feedback mechanism, a printer, any other mechanism capable of presenting an output to a user, or any combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of identifying a vehicle by a security system, comprising:
   detecting a security event by a pedestal scanner of an establishment, as an individual is exiting the establishment;
   obtaining, based on detecting the security event, vehicle information associated with a vehicle used in conjunction with the security event;
   storing the vehicle information;
   detecting, based on identifying the stored vehicle information in one or more first images obtained from one or more first cameras located at the establishment or another establishment, the vehicle arriving at the establishment or another establishment; and
   generating, based on detecting the vehicle arriving at the establishment or another establishment, a notification that the vehicle has arrived at the establishment or another establishment.

2. The method of claim 1, wherein the vehicle information is obtained based on one or more second images from one or more second cameras located at the establishment.

3. The method of claim 1, wherein the vehicle information includes license plate number, and wherein obtaining the vehicle information includes obtaining the license plate number based on one or more second images from one or more second cameras located at the establishment.

4. The method of claim 1, wherein obtaining the vehicle information is based on detecting the vehicle leaving the establishment after detected security event.

5. The method of claim 1, further comprising providing the notification to a security personnel or alert system.

6. The method of claim 1, further comprising providing the notification to a video surveillance system.

7. The method of claim 1, further comprising providing the notification to an access control system for the establishment or parking lot for the establishment.

8. The method of claim 7, wherein the access control system is configured to deny, based on the notification, access for the vehicle to the establishment or the parking lot.

9. An apparatus, comprising:
   one or more memories storing instructions for identifying a vehicle associated with a security event at an establishment; and
   one or more processors communicatively coupled with the one or more memories, wherein the one or more processors are configured to:
   detect a security event by a pedestal scanner of an establishment, as an individual is exiting the establishment;
   obtain, based on detecting the security event, vehicle information associated with a vehicle used in conjunction with the security event;
   store the vehicle information;
   detect, based on identifying the stored vehicle information in one or more first images obtained from one or more first cameras located at the establishment or another establishment, the vehicle arriving at the establishment or another establishment; and
   generate, based on detecting the vehicle arriving at the establishment or another establishment, a notification that the vehicle has arrived at the establishment or another establishment.

10. The apparatus of claim 9, wherein the one or more processors are configured to obtain the vehicle information based on one or more second images from one or more second cameras located at the establishment.

11. The apparatus of claim 9, wherein the vehicle information includes license plate number, and wherein the one or more processors are configured to obtain the vehicle information including the license plate number based on one or more second images from one or more second cameras located at the establishment.

12. The apparatus of claim 9, wherein the one or more processors are configured to obtain the vehicle information based on detecting the vehicle leaving the establishment after detected security event.

13. The apparatus of claim 9, wherein the one or more processors are configured to provide the notification to a security personnel or alert system.

14. The apparatus of claim 9, wherein the one or more processors are configured to provide the notification to a video surveillance system.

15. The apparatus of claim 9, wherein the one or more processors are configured to provide the notification to an access control system for the establishment or parking lot for the establishment.

16. The apparatus of claim 15, wherein the access control system is configured to deny, based on the notification, access for the vehicle to the establishment or the parking lot.

17. One or more non-transitory computer-readable media storing instructions, executable by one or more processors, for identifying a vehicle by a security system, the instructions comprising instructions for:

detecting a security event by a pedestal scanner of an establishment, as an individual is exiting the establishment;

obtaining, based on detecting the security event, vehicle information associated with a vehicle used in conjunction with the security event;

storing the vehicle information;

detecting, based on identifying the stored vehicle information in one or more first images obtained from one or more first cameras located at the establishment or another establishment, the vehicle arriving at the establishment or another establishment; and generating, based on detecting the vehicle arriving at the establishment or another establishment, a notification that the vehicle has arrived at the establishment or another establishment.

18. The one or more non-transitory computer-readable media of claim 17, wherein the vehicle information is obtained based on one or more second images from one or more second cameras located at the establishment.

19. The one or more non-transitory computer-readable media of claim 17, wherein the vehicle information includes license plate number, and wherein the instructions for obtaining the vehicle information includes obtain the license plate number based on one or more second images from one or more second cameras located at the establishment.

20. The one or more non-transitory computer-readable media of claim 17, wherein the instructions for obtaining the vehicle information obtain the vehicle information based on detecting the vehicle leaving the establishment after detected security event.

\* \* \* \* \*